H. L. DUNCAN.
FABRIC.
APPLICATION FILED OCT. 11, 1918.
1,410,899. Patented Mar. 28, 1922.
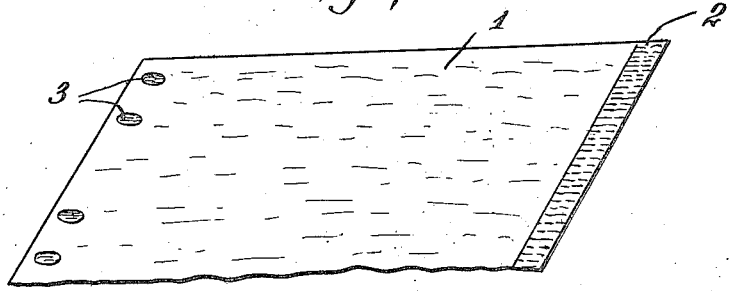
Fig. 1.
Fig. 2. embossing
Fig. 3. hard cured / soft cured — phenolic condensation product — fabric
Fig. 4. stitching
Fig. 5.
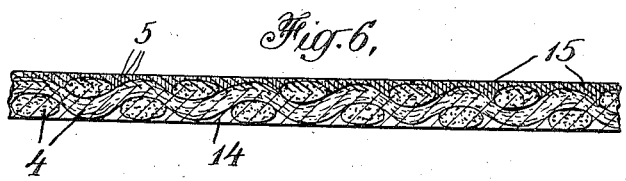
Fig. 6.
Inventor
Harry L. Duncan

UNITED STATES PATENT OFFICE.

HARRY L. DUNCAN, OF MAHWAH, NEW JERSEY.

FABRIC.

1,410,899.  Specification of Letters Patent.  Patented Mar. 28, 1922.

Application filed October 11, 1918. Serial No. 257,707.

*To all whom it may concern:*

Be it known that I, HARRY L. DUNCAN, a citizen of the United States, and resident of Mahwah, Bergen County, New Jersey, have made a certain new and useful Invention Relating to Fabrics, of which the following is a specification, taken in connection with the accompanying drawing, which forms part of the same.

This invention relates especially to cloth or other fabrics more or less coated or impregnated with phenolic condensation cementing material with which sufficient softening agents of a waxy or oily character, for instance, are incorporated so that when substantially or fully cured the finely divided cementing material between the fibres of the fabric is not undesirably brittle and the fabric has a considerable degree at least of flexibility. For convenience of preparation such special soft curing phenolic condensation cementing material may be prepared by incorporating suitable proportions of castor oil with bakelite, condensite or redmanol varnish compositions and when sufficient castor oil has been incorporated preferably with slight heating in bakelite varnish No. 1 so that the resulting compositions contain fifteen to thirty per cent more or less of castor oil good results are secured in producing relatively flexible canvas or other fabrics which may contain if fully impregnated with such compositions some twenty to forty or even fifty per cent in some cases of such cured cementing material. The cured phenolic condensation cementing material of this special character contains of course a relatively higher proportion of the oily softening material used because of the elimination of the relatively volatile solvents usually employed, so that the castor oil may after curing amount to twenty-five to thirty-five per cent more or less of the cured cementing material. Such soft curing cementing materials may be applied to paper, woven, braided, knit or formed cloth, cord, thread or other fabric or fibrous material in any suitable way as by spraying or roller or brush-coating or immersing processes, so that the fabric, etc. may be thoroughly impregnated with the cementing material or more or less heavily coated on one side, for instance. In some cases it is quite desirable to have portions of the fabric coated with or contain relatively harder curing phenolic condensation cementing material, such, for instance, as bakelite varnish containing considerably less castor oil, aniline or other softening agent, or if desired, normal hard curing bakelite varnish or compositions may be used so as to facilitate cementing such portions of the treated fabrics where spots or other areas contain such relatively hard curing cementing material. Furthermore in some cases, if desired, superficial or other layers of the fabric may contain such hard curing cementing material as regular bakelite varnish while other layers or portions are coated or impregnated with the softer curing material. It is in many cases desirable to minimize the textured appearance of the fabric on one or both surfaces and this may be effected by napping up such surfaces or by applying thereto additional amounts of generally similar fibrous material such as finely cut cotton fiber which may be incorporated in the soft curing phenolic condensation cementing material applied to cotton cloth, for instance. Such a napped surface after having been impregnated or coated with such soft curing cementing material may be embossed or formed with pattern indentations of any desired character before or after it is completely cured, or if desired, this may be done by curing it under pressure in a suitably surfaced mould, although it is unnecessary to cure such coated or impregnated fabric of this general character under pressure in all cases. For some purposes it is desirable to have the phenolic condensation cementing material colored by incorporating suitable soluble or inert coloring material therewith and the cloth, paper or other fabric may also be dyed or colored to the same or different shades or colors before applying such coating to give special effects. These treated fabrics which may imitate or resemble leather in some cases may be used for such purposes as the manufacture of shoes, garments, etc.

In the accompanying drawing showing in a somewhat diagrammatic way illustrative embodiments of this invention, Fig. 1 is a perspective view showing a portion of such fabric; and Figs. 2 to 6 are enlarged diagrammatic sections showing different fabrics.

Canvas or other cotton or other suitable fabric or material may be coated with such soft curing phenolic condensation cementing material and such other cloths or paper are preferably of a fairly open texture, where thorough impregnation is desired may also be used in some cases. As indicated in Fig. 1 the fabric 1 may be more or less thoroughly and uniformly coated or impregnated with such soft curing phenolic condensation cementing material as a composition of bakelite varnish No. 1 and castor oil containing about twenty-five per cent of castor oil where considerable flexibility is to be secured with eight ounce army duck, for instance. Instead of uniformly coating the entire web or sheet of fabric with such soft curing cementing material portions or restricted areas thereof may be coated or impregnated with harder curing or regular bakelite varnish or other phenolic condensation cementing materials. As shown in Fig. 1 a strip or portion 2 of the fabric may be coated in this way and spots or relatively small separated areas 3 may be similarly coated with such hard curing cementing material to facilitate uniting or cementing the fabric to other materials or pieces in some cases. It is sometimes desirable to nap up one or both surfaces of the cotton or other fabric before applying such a soft curing cementing material thereto where it is desirable to hide or minimize the textured appearance of the woven, braided or other fabric and this is indicated in Fig. 2 where the upper surface of the fabric is indicated as napped up, the projecting fibres 5 extending more or less uniformly from the upper surface of the woven threads 4 of the fabric. A more or less superficial coating of relatively soft curing phenolic condensation cementing material 6 may be applied to such a napped surface of canvas or other fabric as by any suitable roll or brush or other fabric as by any suitable roll or brush coating machines, and if the fabric and cementing material are heated during this application the penetration of the cementing material throughout the adjacent portions of the fibres and interstices of the fabric is promoted so that the upper portion of the fabric indicated in Fig. 2 may be more or less uniformly impregnated. After such coating or impregnation of the fabric it may be dried at suitable moderate temperatures of 150° to 200° F, it being desirable to avoid too high a temperature until the solvents used are substantially evaporated, after which the temperature can be raised somewhat, although it is of course undesirable in most cases to cause bubbling or foaming of the cementing material of the fabric to any considerable extent. Good results can be secured when the fabric is being dried and cured without special pressure by having this treatment take place at temperatures of 180° to 200° F. the total treatment lasting some six to ten hours more or less until the phenolic condensation cementing material has been sufficiently cured to be transformed into the permanent substantially or relatively insoluble and stiffer form which is not appreciably sticky to the touch when withdrawn from the curing oven. The partial or complete impregnation of army duck or other cotton fabric with such soft cured phenolic condensation cementing material gives a relatively flexible material of considerably greater strength and stiffness than the original canvas and greatly increased water repelling and waterproof properties are secured, although sufficient porosity or permeability to air may be retained with ordinary woven unnapped canvas so that it can be used for shoe uppers, leggings and other purposes, if desired. Where, however, one of the canvas surfaces has been napped up and the cementing material applied thereto a more uniform surface is secured, especially where the fabric has been originally dyed a leather color and the cementing material is similarly colored before being applied. A substantially smooth surface may be secured in this way, or if desired, the partially or wholly cured fabric preferably in hot condition can be passed through embossing rolls or pressed between embossing dies or plates so as to form pattern indentations 7 therein still more closely simulating leather.

As shown in Fig. 3 the fabric having the woven threads 4 may be substantially completely impregnated throughout the portion 8 with soft curing phenolic condensation cementing material, such as a compound of castor oil and bakelite varnish containing fifteen to twenty-five per cent or more of castor oil while one or more edges, spots or other portions 9 may be thoroughly or superficially impregnated or coated with regular hard curing bakelite varnish so that when the fabric is gradually dried and then cured at the proper heat, preferably under pressure in the case of such hard curing material which may be effected at relatively high temperatures of 250° to 320° F. or so in an hour more or less; the portion 8 may thus be rendered relatively flexible while the portion 9 of the fabric is relatively stronger and more inflexible when cured so that it may be used to better advantage to reenforce metal elements or attachments or cement the cloth to other fabric or material. It is of course understood that such coated fabric which in some cases may contain portions carrying phenolic condensation cementing material of different characters may if desired be dried and then sold and shipped for manufacture into various articles before completely curing the fabric; or in some cases the previously tailored, sewed or assembled fabric articles may then be impregnated or coated with soft curing phenolic condensation cementing material and dried and cured in this condition. Of course a number of layers of cloth or other fabric may be impregnated or coated with soft curing phenolic condensation cementing material of this character either before or after they are tailored or sewed together to form wearing apparel or other articles.

Fig. 4 shows two layers 11, 12 of fabric which may as indicated be preliminarily attached or connected by stitching, such as 10, either before or after being coated or impregnated with soft curing phenolic condensation cementing material of this general character. The fabric may then be dried and cured under pressure, if desired, which more thoroughly cements the different layers of fabric together and also compacts them where this is desirable.

Fig. 5 shows a sheet or layer of paper 13 which may be of relatively strong long fibred material and when relatively open textured or porous may be quite thoroughly impregnated with such soft curing phenolic condensation cementing material as described. By controlling the proportion of castor oil or other softening agent used the desired degree of flexibility can of course be secured and variations are possible between the relatively soft and flexible results obtained when twenty-five to thirty percent of castor oil, for instance, is present in the bakelite varnish castor oil mixture to the more strong and brittle cured fabrics secured with the lower percentages of the softening agent. As shown in Fig. 6, the fabric comprising the woven threads 4 may, if desired, have its upper surface napped up so that the fibres 5 form a more even surface, or similar short fibres may be incorporated therewith in any suitable way, as for instance, by incorporating a considerable proportion of fibrous material of a similar character in the phenolic condensation cementing material applied to the fabric, such as cotton fibre of short length where cotton fabric is coated. By applying a relatively small proportion of relatively hard curing bakelite varnish or other phenolic condensation cementing material to the upper surface of the fabric a relatively thin layer 15 may be formed thereon and if this is dried and partly cured at low heat so as to avoid excessive melting and penetration throughout the fabric the cementing material is sufficiently cured or solidified so as to be in plastic condition where it does not melt so readily on increase of temperature. The other surface of the fabric may then have applied thereto a considerably greater coating or quantity 14 of softer curing phenolic condensation cementing material which may be forced or allowed to penetrate throughout the fabric under the influence of heat and then dried and cured in any suitable way without undesirably interfering with the hard curing cementing material united thereto which has more or less impregnated the threads and fibres on the other side of the cloth. In this way a considerably greater flexibility may be secured by having the body of the fabric coated with such soft curing material, while at the same time a harder and less penetrable surface is formed by the hard curing bakelite varnish or other phenolic condensation cementing material. If desired, however, the hard curing material may by greater initial heating or by being applied in special ways penetrate more deeply and thoroughly throughout the ultimate fibres so that a less continuous superficial coating is left and the softer curing cementing material subsequently applied can more thoroughly impregnate the fibres around any localized spots or portions carrying the harder material. By using usual spraying methods for applying either the hard or soft curing cementing materials special effects can be produced which are desirable for some special purposes and of course relatively small and separated spots or portions of such hard curing cementing material on fabric which is otherwise coated or impregnated with the more flexible cured composition does not interfere with the general flexibility sufficiently to be objectionable for some purposes for which leather is ordinarily used. It is of course understood that aside from the coloring materials referred to other inert loading or wear resisting material preferably in powdered form may be incorporated with these phenolic condensation cementing materials in addition to fibre of various kinds as already indicated.

This invention has been described in connection with a number of illustrative embodiments, forms, proportions, elements, parts, shapes, materials, compositions, and methods of preparation, production and use, to the details of which disclosure the invention is not of course to be limited, since what is claimed as new and what is desired to be secured by Letters Patent is set forth in the appended claims.

1. The canvas fabric having a napped surface comprising separated fibres to render less prominent the textured appearance thereof and portions of said fabric carrying and substantially impregnated with soft cured phenolic condensation cementing material comprising about twenty to thirty-five per cent of castor oil softening material, portions of said fabric carrying hard cured and relatively strong inflexible phenolic condensation cementing material.

2. The canvas fabric having a surface comprising separated fibres to render less prominent the textured appearance thereof and portions of said fabric carrying and substantially impregnated with soft cured phenolic condensation cementing material comprising castor oil softening material, portions of said fabric carrying hard cured and relatively strong inflexible phenolic condensation cementing material.

3. The fabric having a surface comprising separated fibres to render less prominent the textured appearance thereof and carrying and substantially impregnated with soft cured phenolic condensation cementing material comprising castor oil softening material.

4. The woven fabric having portions carrying and substantially impregnated with soft cured phenolic condensation cementing material comprising about twenty to thirty-five per cent of castor oil softening material, portions of said fabric carrying hard cured and relatively strong inflexible phenolic condensation cementing material.

5. The fabric having portions carrying and substantially impregnated with soft cured phenolic condensation cementing material comprising softening material, portions of said fabric carrying hard cured and relatively strong inflexible phenolic condensation cementing material.

6. The canvas fabric having a surface carrying separated fibres to render less prominent the textured appearance thereof and carrying and substantially impregnated with soft cured phenolic condensation cementing material comprising about twenty to thirty-five per cent of castor oil softening material.

7. The fabric having a surface carrying separated fibres to render less prominent the textured appearance thereof and carrying and substantially impregnated with soft cured phenolic condensation cementing material comprising softening material.

8. The canvas fabric having a surface carrying separated fibres to render less prominent the textured appearance thereof and carrying and substantially impregnated with soft curing phenolic condensation cementing material comprising about twenty to thirty-five per cent of castor oil softening material.

9. The fabric carrying and substantially impregnated with soft curing phenolic condensation cementing material comprising castor oil softening material.

10. The relatively flexible cloth having at least portions thereof impregnated with and carrying about fifteen to thirty-five per cent by weight of soft cured phenolic condensation material containing incorporated oily softening material.

11. The relatively flexible cloth having at least portions thereof impregnated with cured phenolic condensation material containing incorporated oily softening material.

12. The flexible canvas fabric having portions thereof carrying and impregnated with soft cured phenolic condensation strengthening material containing incorporated softening material and having portions thereof carrying hard cured phenolic condensation cementing material.

13. The fabric having portions thereof carrying soft cured phenolic condensation strengthening material containing incorporated softening material and having portions thereof carrying hard cured phenolic condensation cementing material.

14. The canvas fabric having a napped surface at least portions thereof carrying cured phenolic condensation cementing material, said cementing material being of substantially the same color as the fibers of said fabric.

15. The cotton fabric having a dyed napped surface comprising separated fibres to render less prominent the textured appearance thereof and coated and substantially impregnated with cured phenolic condensation cementing material of substantially the same color as the adjacent portion of the finished fabric.

16. The fabric having a dyed surface and carrying and substantially impregnated with cured phenolic condensation cementing material of substantially the same color as the adjacent portion of the finished fabric.

HARRY L. DUNCAN.